United States Patent [19]

Mininni et al.

[11] Patent Number: 4,863,799

[45] Date of Patent: Sep. 5, 1989

[54] SHEATH CORE SPUN ORGANOSILICON PRECERAMIC FIBERS AND PROCESSES FOR PRODUCTION

[75] Inventors: Robert M. Mininni, Califon; Richard M. Arons, Princeton Junction, both of N.J.

[73] Assignee: Hoechst Celanese Corp., Somerville, N.J.

[21] Appl. No.: 865,717

[22] Filed: May 22, 1986

[51] Int. Cl.⁴ .............................................. D02G 3/00
[52] U.S. Cl. .................................... 428/373; 428/367; 428/374; 428/391; 428/394; 428/395; 428/401; 428/447; 428/451; 501/88; 501/95
[58] Field of Search ............... 428/373, 374, 375, 391, 428/394, 395, 447, 451, 367, 401; 501/95, 88

[56] References Cited

U.S. PATENT DOCUMENTS

| 3,760,052 | 9/1973 | Fukuma et al. | 264/174 |
| 3,992,499 | 11/1976 | Lee | 428/373 |
| 4,161,500 | 7/1979 | Schlunitz et al. | 428/373 |
| 4,236,245 | 11/1980 | Freeny et al. | 370/94 |
| 4,293,516 | 10/1981 | Parkin | 264/168 |
| 4,310,651 | 1/1982 | Baney et al. | 528/23 |
| 4,312,970 | 1/1982 | Gaul, Jr. | 528/32 |
| 4,340,619 | 7/1982 | Gaul, Jr. | 428/447 |
| 4,342,712 | 8/1982 | Yajima et al. | 525/477 |
| 4,482,669 | 11/1984 | Seyferth et al. | 528/28 |
| 4,482,689 | 11/1984 | Haluska | 428/447 |
| 4,507,983 | 4/1985 | Kiss | 428/906 |
| 4,559,191 | 12/1985 | Arons | 264/60 |
| 4,694,060 | 9/1987 | Porte et al. | 525/475 |

FOREIGN PATENT DOCUMENTS 59-168121 9/1984 Japan .

Primary Examiner—Lorraine T. Kendell
Attorney, Agent, or Firm—Depaoli & O'Brien

[57] ABSTRACT

Ceramic fibers are prepared from improved preceramic fibers having a core comprising an organosilicon preceramic polymer and at least one co-spun sheath layer comprising a synthetic film-forming polymer.

3 Claims, No Drawings

SHEATH CORE SPUN ORGANOSILICON PRECERAMIC FIBERS AND PROCESSES FOR PRODUCTION

RIGHTS OF THE GOVERNMENT

This invention was made with Government support under a Subcontract with Dow Corning under Prime Contract No. F33615-83-C-5006 awarded by the Department of Defense (DOD). The Government has certain rights in this invention.

FIELD OF THE INVENTION

This invention relates to the production of preceramic and ceramic fibers from organosilicon polymers.

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

Ceramics made from organosilicon polymers have the potential to overcome these problems. To this end, polymers based on silicon, carbon and/or nitrogen and oxygen have been developed. See, for example, "Siloxanes, Silanes and Silazanes in the Preparation of Ceramics and Glasses" by Wills et al, and "Special Heat-Resisting Materials from Organometallic Polymers" by Yajima, in Ceramic Bulletin, Vol. 62, No. 8, pp. 893–915 (1983), and the references cited therein.

The major and most critical application for ceramics based on polymer processing is high strength, high modulus, reinforcing fibers. Such fibers are spun from organosilicon preceramic polymers, and then cured and pyrolyzed to their ceramic form. The low molecular weight and highly branched structure of typical preceramic polymers, however, alters the spinning and subsequent fiber handling behavior of these polymers from that of conventional polymers. In particular, gelation and foaming tendencies in the melted polymers used for melt spinning may lead to the presence of undesirable flaws in the resulting fiber. Such flaws are undesirable in fine diameter fibers since they are believed to be the source of cracking and lowered tensile strength. Furthermore, because of the low molecular weight of the preceramic polymers used, the fibers spun therefrom have relatively low tensile strength and are difficult to handle in spinning, curing and subsequent pyrolysis operations. In addition, some of the organosilicon preceramic polymers used are preferably protected from the atmosphere in the production and curing of preceramic fibers prepared therefrom.

Thus, the search has continued for improvements in these non-conventional spinning and fiber handling areas of ceramic fiber technology. The present invention was made as a result of this search.

SUMMARY OF THE INVENTION

Accordingly, a primary object of the present invention is to provide improved processes for the production of preceramic and ceramic fibers from organosilicon preceramic polymers.

Another object of the present invention is to provide improved melt spinning and dry spinning processes for the production of fine diameter, organosilicon preceramic fibers and ceramic fibers having high tensile strength, made therefrom.

Another object of the present invention is to provide improved processes for the production of preceramic and ceramic fibers based upon organosilicon preceramic polymers, which fibers have improved handleability, e.g., increased toughness and protection of the organosilicon preceramic material from abrasion and the atmosphere.

Still another object of the present invention is to provide improved processes for the production of improved preceramic fibers based upon organosilicon preceramic polymers, in which the organosilicon polymer material is protected from degradation by the oxygen and moisture in air.

In accordance with one aspect of the present invention, an improved preceramic fiber is provided, having a core comprising an organosilicon preceramic polymer and at least one co-spun sheath layer comprising a synthetic film-forming polymer compatible with said organosilicon polymer.

In accordance with another aspect of the present invention, an improved ceramic fiber is provided, which fiber is prepared by curing and pyrolyzing a preceramic fiber which has a core comprising an organosilicon preceramic polymer and at least one co-spun sheath layer comprising a synthetic film-forming polymer compatible with said organosilicon polymer.

In accordance with another aspect of the present invention, an improved process for producing a preceramic fiber from an organosilicon preceramic polymer comprises the steps of providing a polymer spinning composition comprising a solid organosilicon preceramic polymer and at least one additional spinning composition comprising a synthetic film-forming polymer compatible wigh said organosilicon polymer, and co-spinning said spinning compositions to form a sheath core preceramic fiber having a core comprising an organosilicon preceramic polymer and at least one co-spun sheath layer comprising the synthetic film-forming polymer. In specific embodiments of this aspect of the invention, the polymer spinning compositions of the organosilicon preceramic polymer and the compatible synthetic film-forming polymer can each be homogeneous melts or spinning solutions comprising at least about 70 weight percent or from about 10 to 30 weight percent polymer solids in a solvent, respectively, with the melts being melt spun and the spinning solutions being dry spun, respectively, in each case to form a sheath core fiber. The selection of the polymer and solvent, when used, for the sheath layer is a critical aspect of the invention, since, e.g., the organosilicon preceramic polymers and fibers formed therefrom can be adversely affected by contact with certain solvents.

In accordance with yet another aspect of the present invention, an immproved process for producing a ceramic fiber is provided, comprising the steps of curing a sheath core spun preceramic fiber prepared in accordance with one of the processes described above at a temperature to render at least the sheath layer infusible, and thereafter pyrolyzing the cured fiber at a temperature effective to produce a ceramic fiber.

These and other objects, aspects and advantages, as well as the scope, nature and utility of the present invention, will be apparent from the following description and appended claims.

DESCRIPTION OF THE PREFERRED EMBODIMENTS

The Organosilicon Preceramic Polymers

Organosilicon preceramic polymers are well known in the art. Such polymers contain silicon, carbon and/or nitrogen, and oxygen, are fiber-forming, and can be cured and pyrolyzed to ceramic form. See, for example, U.S. Pat. Nos. 4,310,651; 4,312,970; 4,342,712; 4,482,689 and 4,340,619, which are incorporated herein by reference. Such polymers optionally may be modified with chemical groups to allow subsequent curing in the absence of oxygen. See, for example U.S. Pat. Re. No. 31,947, which is incorporated herein by reference.

These organosilicon precursor polymers may be made in a variety of ways as is known in the art. For example, they may be made by first dechlorinating an alkylchlorosilane, e.g., dimethyldichlorosilane, and polymerizing the product to form a polysilane, e.g., polydimethylsilane. This material is then heated to convert its backbone of silicon atoms to a backbone of alternating silicon and carbon atoms by forming a polycarbosilane.

Preferably, the organosilicon preceramic polymers utilized in the present invention consist essentially of silicon, carbon, nitrogen and oxygen. Such polymers are typically prepared by reacting a disilazane and a dichlorodisilane or a methylchlorodisilane.

Most preferably, the organosilicon preceramic polymers of the present invention are characterized as polysilazanes prepared from methylchlorodisilanes and hexamethyldisilazane. Particularly preferred are the polysilylazanes, containing N—Si—Si—N linkages. Optionally, the addition of difunctional monosilanes as co-reactants may be used to enhance spinning and/or subsequent fiber handling properties. Such difunctional monosilanes include preferably $R_1R_2SiCl_2$, where $R_1$ and $R_2$ may independently be a ethyl, phenyl or vinyl group.

Such organosilicon preceramic polymers may be further modified, for example, by incorporating vinyl functionality by reacting with the polymer itself. This may be achieved, for example, by co-reacting the polymer with a vinyl (Vi) halosilane such as $ViR_1R_2SiCl$, where $R_1$ and $R_2$ may each independently be methyl or phenyl.

Another preferred type of organosilicon polymer which is thermally sensitive and which may be especially suitable in the present invention comprises a plurality of cyclic and/or linear precursor residues of the repeating units of formula I:

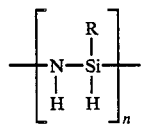

linked together by $Si_2N_2$ bridges of formula II,

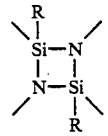

wherein R is hydrogen, a lower alkyl group having from 1 to about 6 carbon atoms, a substituted or unsubstituted vinyl group, a substituted or unsubstituted allyl group, a substituted or unsubstituted benzyl group, a substituted or unsubstituted lower aryl group having from 6 to about 10 carbon atoms, a tri(lower)alkyl or di(lower)alkylsilyl group, a di(lower)alkylamino group, a lower alkoxy group having from 1 to about 6 carbon atoms; and n is an integer greater than one. The substituted groups are substituted with lower alkyl and lower aryl groups.

These polymers form novel ladder-like or planar array structures that are soluble in common organic solvents, stable at room temperature and thermally stable up to about 550° C. The ladder-like or planar array polymers of the present invention are formed in high yield by reaction of the cyclic and/or linear residues in the presence of a basic catalyst capable of deprotonating an NH function adjacent to silicon.

These polymers and their preparation are described more fully in U.S. Pat. No. 4,482,669 to Seyferth et al, assigned on its face to Massachusetts Institute of Technology, which patent is herein incorporated by reference.

Molecular weight ($M_n$) for the above organosilicon preceramic polymers may vary from about 500 to 20,000, preferably about 700 to 5,000, and most preferably 1,000 to 2,000 (g/mole-GPC method). These polymers may also have softening temperatures ($T_s$) of about 50° C. to 308° C., preferably about 60° C. to 200° C., and most preferably 70° C. to 150° C.

The Synthetic Film- or Fiber-Forming Polymers

In accordance with the present invention, compositions comprising the organosilicon preceramic polymers described above are spun to form a core, with suitable other synthetic film-forming polymers used for spinning at least one sheath layer of the preceramic sheath core fibers.

Suitable polymers can be selected generally from varous types which improve the processability of the organosilicon preceramic fiber, and/or the toughness of the sheath core fibers spun therefrom. The sheath polymers should be compatible with the organosilicon polymers, physically and chemically. For successful sheath core spinning, it is necessary that the materials extruded form two immiscible phases, with a defined interface between the phases forming the sheath and core as spun. The interface need not be sharp or discontinuous, but should be smooth and uniform rather than containing pits, discontinuities, or the like. Since two molten polymer streams or two polymer solution streams in contact with each other can mix more easily than, e.g., a coating solution applied to a freshly-spun polymer fiber, conditions must be carefully controlled to obtain the desired sheath core structure. The sheath is spun from at least one suitable film-forming polymer, i.e., a polymer which can be extruded in a thin, continuous film-like coating or sheath surrounding the core, without beading or formation or discontinuities due to surface effects, and remaining continuous when solvent is removed or the fiber cools. Similar properties are required for the polymer composition comprising the organosilicon preceramic polymer (preferably consisting essentially of such polymer) which is spun to form the core; this melt or polymer solution should be extrudable to form a continuous fiber core without significant discontinuities or flaws, and hence may be termed a fiber-forming composition or polymer.

Depending upon whether the polymer spinning compositions are to be prepared and spun as melts or solutions, the polymers can be thermoplastic and/or thermosetting polymers. Suitable thermoplastic polymers include various vinyl polymers, polyolefins, polyesters, polyacrylics, polyacetals, polyamides, polybenzimidazoles, polyurethanes and thermotropic liquid crystalline polymers. Water permeable polymers such as cellulosic polymers can also be used.

As non-limiting examples of the types of synthetic polymers which can be used to sheath the organosilicon polymers, the following are offered:

Polyacetals: various addition polymers of formaldehyde.

vinyl polymers: polyvinyl halides such as polyvinyl chloride, polyvinyl aromatics such as polystyrene and poly(alphamethyl styrene), cis-polyisoprene, polyvinyl alcohols, polyvinyl esters, etc.

polyolefins: polyethylene, polypropylene and various copolymers of alpha-olefins having from 2 to about 6 carbon atoms.

polyamides: various nylons, such as nylon 66, nylon 6 and nylons 1, 4, 9, 11 and 12.

polybenzimidazoles: as disclosed in U.S. Pat. No. 4,236,245, which is hereby incorporated by reference.

polyesters: polyethylene terephthalate, polybutylene terephthalate, etc.

polyacrylics: polyacrylonitrile, polyacrylic acid, polymethacrylate, polymethylmethacrylate, etc.

polyurethanes: polymers derived from the reaction of polyesters or polyester diols with diisocyanates, and optionally from further reactions of such components with chain-extending agents such as low molecular weight polyols.

thermotropic liquid crystalline polymers: wholly aromatic polyesters, aromatic-aliphatic polyesters, wholly aromatic poly(ester-amides), aromatic-aliphatic poly(ester-amides), aromatic polyazomethines and aromatic polyestercarbonates, as disclosed in U.S. Pat. No. 4,507,983, which is herein incorporated by reference.

Thermosetting resins, either uncured or partially cured (i.e., advanced), can be used in the polymer sheath or core solutions. Suitable thermosetting resins can generally be selected from those resins used in the production of fiber reinforced composites by prior art techniques, provided they are sufficiently soluble in a solvent, inert to the polymer of the preceramic fiber, and retain a suitable flexibility when the solvent is removed by thermal evaporation. Exemplary resins include epoxy resins, phenolic resins, polyester resins, polyimide resins, etc. Suitable solvents for thermosetting resins include acetone, methyl ethyl ketone, dimethyl ketone, perchloroethylene, methylene chloride, ethylene dichloride, and dimethylformamide. Various epoxy resin curing agents can be used in conjunction with the epoxy resins.

Cellulosic polymers useful as water-permeable polymers include various cellulose esters of carboxylic acids, including mixed esters, such as cellulose acetate, cellulose propionate, cellulose acetate propionate, and the like.

Although generally the polymer sheath will provide sufficient strength for the core, in one aspect of the present invention, at least one of the organosilicon preceramic polymers described above is blended with at least one suitable other synthetic fiber-forming polymer to form a spinnable blend for spinning the preceramic core fibers. When melt spinning is to be used, a melt blend is preferably formed of at least one organosilicon polymer and at least one suitable thermoplastic polymer, with blending and melting taking place in any suitable sequence. When dry spinning is to be used, at least one organosilicon polymer and at least one other fiber-forming polymer (which can be thermoplastic or thermosetting) are solubilized and blended in a common solvent or separate miscible solvents to form the polymer solution for spinning.

Suitable polymers for blending can be selected generally from various types which improve the processability of the organosilicon preceramic fiber, and/or the toughness of the core fibers spun therefrom. The polymers blended should be mutually compatible, physically and chemically. In other words, the melting points of the polymers used in a melt blend should be comparable, with the melting point of the organosilicon preceramic polymer being highest but not exceeding the degradation temperature of any of the added polymers. The combined polymers can thus be melted to form a homogeneous blend having a suitable viscosity for spinning without approaching temperatures at which the thermally sensitive organosilicon polymer might tend to cross-link or any of the additional polymers might reach decomposition temperature. The polymers should not form separate phases when blended together in melts or solutions, and should not react with or otherwise degrade each other.

Sheath Core Spinning of the Fibers

As indicated earlier, compositions comprising the above-described organosilicon preceramic polymers and compatible synthetic film-forming polymers are co-spun in sheath core fashion to form sheath core fibers, using either melt spinning or dry spinning processes.

To melt spin, the solid organosilicon polymer and at least one additional compatible thermoplastic polymer are separately melted at a temperature and rate sufficient to avoid gelation and foaming, and substantially immediately thereafter the melted polymers are co-spun or extruded using suitable spinning apparatus to form strong, fine diameter sheath core organosilicon preceramic fiber. If desired, the melt for the core can be a blend of the organosilicon polymer with another thermoplastic polymer.

Prior to spinning, any gel detected in the polymer melts should be removed such as by filtration. In addition, the polymer melts should be essentially free of other contaminants such as small insoluble particulates.

The relatively short residence time of the organosilicon polymer in the melt is desirable to achieving strong, fine diameter fibers. If an organosilicon polymer blend is brought up to a melt-processable or extrudable temperature and held at such temperatures for too long a period of time, gelation will occur, which in turn will lead to the presence of noticeable flaws in the fiber and a concomitant loss of tensile properties. In addition, the melt temperature of the organosilicon polymer melt should be less than that which would cause foaming of the polymer, which foaming will also lead to the presence of voids or flaws in the fiber. The typical organosilicon polymer is significantly more melt sensitive as compared to other conventional fiber-forming polymers, e.g., polyethylene terephthalate.

While allowable total melt residence time may vary from one particular organosilicon polymer melt to another, in general the total melt residence time should be less than thirty minutes, e.g., about one to twenty minutes, preferably less than about 10 minutes, and most preferably less than five minutes. To minimize melt residence time, it may be appropriate to use a ram extruder for at least the core melt, which is generally more temperature sensitive than the sheath melt.

The actual melt temperatures of the respective polymer melts may vary, but will generally be above the softening temperature ($T_s$) of the polymers, but below that at which foaming, gelation or other degradation occurs within the total melt residence time. Typically, such melt temperatures will range from about 30 to 130, preferably from about 50 to 100, and most preferably 60° to 80° C. above the $T_s$ of each polymer.

As the preceramic fibers are melt spun or extruded, fiber handling is preferably minimized to avoid abrasion of the sheath layer sufficient to cause fiber breakage during fiber take-up and/or sufficient to induce latent stressing sufficient to cause fiber breakage during subsequent curing and ceramization. Thus, those types of conventional fiber take-up apparatus which induce high levels of stress in fiber are preferably not used. Although the preceramic cores as spun are relatively brittle due to their relatively low molecular weight and highly branched structure as compared to conventional fiber-forming polymers, the sheath layer of conventional polymer adds considerable strength and protection from abrasion and the atmosphere.

The preceramic sheath core fibers as spun may be taken up in any appropriate draw ratio. Draw ratios of about 10 to about 1000, preferably 50 to 800, and most preferably 200 to 400, may be used.

Spinning may be conducted at any convenient die pressure in ambient conditions, or nitrogen or other inert gas may be used in the spinning chamber, and at atmospheric, subatmospheric, or superatmospheric pressure.

To dry spin, the solid organosilicon polymer and at least one additional film-forming polymer, which can be either thermoplastic or thermosetting, are separately dissolved in suitable solvents at suitable polymer solids concentrations, and thereafter the polymer spinning solutions are co-spun or extruded in sheath core fashion to form a flaw-free sheath core organosilicon preceramic fiber. If desired, the organosilicon polymer solution can contain at least one additional fiber-forming polymer, which can be thermoplastic or themosetting.

Any suitable solvent(s) in which the organosilicon polymer and additional film- or fiber-forming polymer(s), respectively, may be dissolved at suitable solids concentrations may be used, provided the solvents are chemically compatible with the other polymer and solvent used. It is especially important that solvents to which the organosilicon preceramic polymers are sensitive be avoided. Combinations of solvents can be used—e.g., different, mutually miscible solvents can be used to dissolve the organosilicon polymer and additional polymer(s), with the resulting solutions then being blended to form a homogeneous solution of the polymer blend. Solvents with relatively low boiling points are preferred, to permit the efficient extraction of solvent fromt the spun fibers without adversely affecting the organosilicon polymer. When mixed solvents are used, their boiling points should be similar, to permit efficient extraction. A different solvent can be used for the sheath solution than for the core solution, permitting techniques such as the use of a solvent in the sheath which is easily and rapidly removed during a solvent extraction step, allowing the solvent to be extracted from the core off-line after it is wound on a bobbin or other storage device.

Suitable aliphatic hydrocarbon solvents may include those having from 1 to about 8 carbon atoms and having boiling points ranging from about 38° C. to about 190° C. Typical useful aliphatic hydrocarbon solvents include n-hexane, cyclohexane, cyclohexene, n-pentane, cyclopentadiene, iso-octane, and the like. Suitable aromatic hydrocarbon solvents may include those having from 6 to about 10 carbon atoms and have boiling points ranging from about 70° to 180° C. Typical aromatic hydrocarbon solvents include toluene, xylene, styrene, benzene, chlorobenzene, dichlorobenzene, ethylbenzene and isopropylbenzene. Toluene and xylene are particularly preferred.

Other suitable solvents include halocarbons having from 1 to about 2 carbon atoms, such as carbon tetrachloride; halogenated hydrocarbons having from 1 to about 10 carbon atoms, such as dichloroethane, trichloroethane, hexachloroethane, chloroform, methyl chloroform and methylene chloride; alkyl esters having from 2 to about 8 carbon atoms, such as methyl acetate and ethyl acetate; cyclic ethers having from 3 to about 6 carbon atoms. such as tetrahydrofuran, and nitrogenous solvents having from 3 to about 8 carbon atoms, including nitrated hydrocarbons such as nitromethane, heterocycles such as pyridine, amides such as dimethylformamide, and the like.

Relatively high solids concentrations of the polymers in the core spinning solutions are important to achieving a self-supporting threadline with these low-molecular weight, highly branched organosilicon weight polymers. If insufficiently high organosilicon polymer solids concentrations are used, threadline breakdown will frequently occur, which in turn will lead to the presence of noticeable flaws in the fiber and a concomitant loss of tensile properties. Although with the support of the sheath, the core solutions may contain as little as sixty-five percent solids, preferably, polymer solids concentrations of at least about seventy percent, and most preferably at least about eighty percent are used. The sheath spinning solution can contain any suitable concentration of polymer solids which will permit the spinning of a continuous film or sheath about the core, generally in the range of from about 10 to about 30 weight percent, preferably from about 15 to about 25 weight percent.

After dissolution and prior to spinning, the polymer solutions should be maintained in solution in an essentially gel-free state, i.e., kept under conditions insufficient to cause gel formation of polymer in the solvent. Prior to spinning, any gel detected in the polymer spinning solutions should be removed, such as by filtration. In addition, the polymer should be essentially free of other contaminants such as small insoluble particulates.

The actual solution temperatures at spinning may vary, but will generally be near the boiling point of the solvents (to improve solvent evaporation) but below that at which foaming, gelation or other degradation occurs within the total dry spinning residence time. Typically, such solution temperatures will be between about 70° C. and 200° C., preferably 70° C. to 160° C., and most preferably 90° C. to 120° C.

As the preceramic fibers are dry spun and solvent extracted, fiber handling is preferably minimized to avoid stressing of the fibers sufficient to cause fiber breakage during fiber take-up and/or sufficient to induce latent stressing sufficient to cause fiber breakage during subsequent curing and ceramization. Thus, those types of conventional fiber take-up apparatus which induce high levels of stress in fiber are preferably not used. Although the preceramic fibers after spinning and solvent extraction are relatively brittle due to their relatively low molecular weight as compared to conventional fiber-forming polymers, the sheath of conventional polymer adds considerable strength and protection from abrasion and the elements.

The preceramic sheath core fibers as dry spun may be taken up in any appropriate draw ratio. Draw ratios of between about 10 to 1000, preferably 15 to 300, and most preferably 20 to 50, may be used to recover a fiber having a diameter of about 5 to about 100 μm, the fiber being taken up with fiber contact at a minimum sufficient to avoid substantial abrasion of the fiber.

Spinning may be conducted at any convenient die pressure in ambient conditions, or nitrogen or other inert gas may be used in the spinning chamber, and at atmospheric, subatmospheric, or superatmospheric pressure.

As indicated above, at least a portion of the solvent, and preferably essentially all of the solvent, is extracted or evaporated from at least the sheath layer of the dry spun preceramic fiber by the use of a non-oxidizing extracting gas at a temperature and pressure effective to vaporize the solvent from the fiber. Typical non-oxidixing gases include inert gases such as nitrogen and argon, which are preferred. Other gaseous media such as air (oxygen), moisture, ammonia, trichlorosilane, etc. may be added to the extracting gas to induce fiber curing.

Atmospheric, subatmospheric or superatmospheric pressures may be used. At atmospheric pressures, temperatures of extraction may range from about 70° C. to 160° C., preferably 90° C. to 120° C.

Conveniently, extraction may take place in the spinning chamber; or if preferred further downstream from the spinning chamber.

Various additives may be added to the extracting gas and/or to the spinning solution. For example, curing additives such as ammonia, trichlorosilane, oxygen and moisture may be incorporated in the spinning solution to aid in the subsequent curing of the fiber. Also, spinning aids such as lubricants and the like may also be incorporated into the spinning solutions.

By incorporating at least one curing additive in the extracting gas to which the sheath polymer is permeable, e.g., water, the organosilicon preceramic polymer core can be at least partially cured while the sheath is intact and the solvent is being extracted.

The preceramic fibers of the present invention have typical overall diameters of from 5 to 100, preferably 6 to 50, and most preferably 8 to 20 μm, with the core diameter being from about 2 to about 80 μm and the sheath being from about 2 to about 20 μm.

Sheath Core Spinning Apparatus

The sheath core fibers of this invention are produced by using apparatus wherein the organosilicon preceramic fiber is spun as a core, while simultaneously the additional fiber-forming polymer is co-spun to form at least one sheath layer concentrically surrounding the core. Various conventional apparatus can be used for such spinning, generally including a central tube or nozzle for spinning the core, surrounded by an annular or concentric slot or ring to spin a sheath layer which surrounds the central core in intimate contact. Representative processes and apparatus for sheath core spinning are disclosed in U.S. Pat. Nos. 3,760,052; 3,992,499; 4,059,949; and 4,161,500, which are hereby incorporated by reference.

Other sheath-core spinning assemblies use the basic concept of feeding the sheath-forming material to the spinneret orifices in a direction essentially perpendicular to the orifices, and injecting the core-forming material into the sheath forming material as it flows into the spinneret orifices, or the counter core leading to the spinneret orifices, from orifices located in-line with the spinneret orifices, such as in U.S. Pat. No. 4,293,516.

Curing of the Fibers

After spinning, the preceramic fibers are typically cured or cross-linked and thereafter pyrolyzed to ceramic form.

Effective curing conditions are defined as those curing conditions after which at least the organosilicon preceramic polymer core of the cured fibers become infusible and the fibers may be pyrolyzed without melting or fusing together. A variety of curing methods may be used. These include oxidative and hydrolytic cures, reactive cures, thermal cures and radiolytic cures. The presently preferred method of curing is via an oxidative/hydrolytic cure. Typically, this entails heating the fibers in a controlled humidity environment, where humidity can range from about 8 to 100 percent.

Curing may be carried out at temperatures from about 50° to 400° C., preferably 100° C. to 280° C., and most preferably 150° C. to 200° C., the rate of curing increasing with temperature.

Normally, fibers of organosilicon preceramic polymers are cured at temperatures below the melting point of the polymers to prevent their fusing together during the curing process, but if a sheath of a high melting point polymer is used, the strength and abrasion resistance provided by the sheath can permit higher temperatures to be used for curing the sheath core fiber, up to and even beyond the melting point of the core polymer if appropriate. As mentioned above, in a preferred embodiment a sheath is spun of a polymer which is permeable to at least one curing agent, such as, e.g., water, so that curing can be begun or accomplished during the solvent extraction phase for dry spun fibers, and/or the thermal curing process can be augmented by the use of curing agents such as moisture. Thus, in producing sheath core fibers by both the melt spinning and dry spinning processes, the sheath can be of a material permeable to at least one curing agent which is to be used, to improve the curing process.

Pyrolysis of the Fibers

Effective pyrolysis conditions are those which render the fibers ceramic. Typically, pyrolysis is conducted in an inert atmosphere of nitrogen, argon, or the like.

Pyrolysis temperatures may be from about 600° to 1600°, preferably 850° to 1400°, and most preferably 1100° to 1400° C. In a preferred embodiment of the present invention, essentially all of the synthetic film-forming polymer used as a sheath layer for the organosilicon preceramic polymer core is driven off or carbonized during pyrolysis.

Utility of the Ceramic Fibers

The ceramic fibers produced in accordance with the present invention may be used in high performance composites of any desired shape, e.g., gas turbine engines, and engine components, as is evident to those skilled in the art. By producing preceramic fibers in sheath core form, the ceramic fibers ultimately obtained therefrom are stronger and contain fewer flaws than ceramic fibers prepared from fibers containing the organosilicon polymers alone. The co-spinning of the core and sheath protects the organosilicon preceramic polymer from the oxygen and moisture in air, permitting simpler processing methods to be used and ultimately resulting in superior preceramic and ceramic fibers.

The present invention is further illustrated by the following specific examples, wherein all parts and percentages are by weight unless otherwise indicated.

EXAMPLE 1

A $(CH_3)_3SiNH$-containing silazane polymer is prepared by quickly adding 188.4 g of $HSiCl_3$ to 500 g hexamethyldisilazane. The mixture is kept under argon at room temperature overnight. The temperature is then raised to 80° C. at a rate of 1° C./minute, held at 80° C. for 30 minutes, and then raised to 270° C. at a rate of 1° C./minute while volatile byproducts are removed by distillation. As the temperature rises from 230° C. to 270° C. ammonia is bubbled through the reaction mixture at a rate of about 110 cc/minute to more effectively remove volatile byproducts. Other gases, such as nitrogen or argon, could also be used. The reaction mixture is then vacuum stripped at 170° C.–200° C. and 80–100 mm Hg for 1.5 hours. A white, cloudy, hard polymer (80.3 g) is obtained. A $(CH_3)_3Si$- to HSi-ratio of about 0.61 is obtained. The polymer has a softening point of 98° C.

A high density, high molecular weight polyethylene is used as the sheath component for covering the silazane polymer core. The polyethylene has a melting point of 105° C.

The silazane polymer and the polyethylene are melted separately and forced through a series of separate filters ($-80/+120$ mesh shattered metal type) to remove gels. Upon exiting the filter pack, the molten polymers are spun through an apparatus for sheath-core fiber formation. The polymers are directed through a 20 hole spinneret (0.2 mm diameter by 0.26 mm long hole). The temperature in the spinning chamber is 185° C. The sheath-core fiber produced is as small as 8 microns with 15 micron spun fiber diameters being more typical. Approximately 10 to 25 percent of the cross section of the fiber is the sheath of polyethylene. The fiber is taken up on a bobbin and then normally stored in a nitrogen-filled dry box prior to subsequent curing and pyrolysis. The sheath-core fiber is now much more resistant to oxidation and can be more easily handled than the more delicate fibers spun solely from organosilicon preceramic polymers.

EXAMPLE 2

An organosilicon polymer, a methylpolydisilazane containing phenyl and vinyl functionality is prepared from methylchlorodisilane, hexamethyldisilazane and phenylvinyldichlorosilane. The polymer has a molecular weight of about 900. The polymerization proceeds in two stages: (1) initial amination of Cl—Cl bonds; and (2) condensation polymerization (increasing molecular weight). Volatiles are driven off during the course of these reactions. Polymer material is then prepared for spinning by dissolving in a toluene solution containing 80% polymer solids.

The sheath material is an acrylonitrile copolymer of 94% acrylonitrile and 6% methylacrylate. The copolymer is dissolved in dimethylformamide. The solution has a concentration of 30% by weight acrylonitrile copolymer.

Dry spinning is done on a spinning apparatus designed for producing sheath-core fibers and to provide effective solvent extraction. In operation, the spinning solution containing the dissolved polymers are pumped separately through a series of filters (wire mesh filter type). Upon exiting the respective filters, the polymer solutions pass through a steam jacketed heat exchanger and then a five hole spinneret ($5 \times 10^{-2}$ mm diameter by 0.3 mm long holes). The sheath-core fibers pass through a nitrogen-filled solvent evaporating glass mantel and then are taken up on a bobbin. The fiber on the bobbin is then stored in a nitrogen-filled chamber and held at a dew point of $-40°$ C. or lower, prior to subsequent curing and pyrolysis.

The temperature inside the spinning chamber at the spinneret is about 46° C. and the average temperature in the drying column is about 160° C. Fiber diameters of about 20 microns are expected with about 10–25% of the cross section comprising the acrylonitrile copolymer sheath.

In an alternative procedure, on-line curing can be provided in the dry spinning process above-described by injecting into the spinning chamber and/or drying column (which contains an inert atmosphere such as nitrogen or argon), a small amount of a suitable curing agent. Thus, both the acrylonitrile copolmer and core of organosilicon preceramic fiber core can be cured by blowing saturated steam at about 150° C. into the spinning duct. Additional curing at elevated temperatures can be provided, if necessary.

Although the invention has been described with preferred embodiments, it is to be understood that variations and modifications can be employed without departing from the gist of the invention.

What is claimed is:

1. A preceramic fiber having a core comprising an organosilicon preceramic polymer, said preceramic polymeric core being a polysilazane or a polysilylazane and having a molecular weight ($M_n$) in the range of from about 500 to 20,000, said fiber having a co-spun sheath layer comprising a cellulosic polymer which is at least partially permeable to a curing agent for said organosilicon preceramic polymer.

2. A preceramic fiber in accordance with claim 1, wherein said core further comprises at least one fiber-forming polymer selected from the group consisting of vinyl polymers, polyolefins, polyesters, polyacrylics, polyacetals, polyamides, polybenzimidazoles, polyurethanes, thermotropic liquid crystalline polymers, epoxy resins, phenolic resins, thermosetting polyester resins and polyimide resins.

3. A preceramic fiber in accordance with claim 1, wherein said organosilicon preceramic polymer is cured until infusible.

* * * * *